United States Patent
Teal et al.

(10) Patent No.: US 10,030,153 B2
(45) Date of Patent: Jul. 24, 2018

(54) SURFACE TREATING COMPOSITION AND METHOD OF USE

(71) Applicant: ILLINOIS TOOL WORKS INC., Glenview, IL (US)

(72) Inventors: Kenneth H. Teal, Houston, TX (US); Janice R. Crayton, Humble, TX (US); Tsao-Chin Clarence Huang, Katy, TX (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 134 days.

(21) Appl. No.: 15/148,059

(22) Filed: May 6, 2016

(65) Prior Publication Data

US 2017/0321064 A1   Nov. 9, 2017

(51) Int. Cl.
| | |
|---|---|
| *C09D 183/04* | (2006.01) |
| *C09D 5/02* | (2006.01) |
| *B29D 30/72* | (2006.01) |
| *B05D 5/06* | (2006.01) |

(52) U.S. Cl.
CPC ............. *C09D 5/028* (2013.01); *B05D 5/063* (2013.01); *B29D 30/72* (2013.01); *C09D 5/021* (2013.01); *C09D 183/04* (2013.01); *B29D 2030/728* (2013.01)

(58) Field of Classification Search
None
See application file for complete search history.

(56) References Cited

U.S. PATENT DOCUMENTS

| | | | |
|---|---|---|---|
| 3,956,174 | A | 5/1976 | Palcher |
| 4,600,436 | A | 7/1986 | Traver et al. |
| 4,790,877 | A | 12/1988 | Vadasz |
| 4,880,557 | A | 11/1989 | Ohara et al. |
| 4,999,398 | A | 3/1991 | Graiver et al. |
| 5,057,572 | A | 10/1991 | Chrobaczek et al. |
| 5,077,040 | A | 12/1991 | Bergmann et al. |
| 5,183,845 | A | 2/1993 | Parkinson et al. |
| 5,244,598 | A | 9/1993 | Merrifield et al. |
| 5,326,483 | A | 7/1994 | Halloran et al. |
| 5,378,271 | A | 1/1995 | Arimoto et al. |

(Continued)

OTHER PUBLICATIONS

Glitter data sheet, 5 pages, uploaded Nov. 2017 (Year: 2017).*

*Primary Examiner* — Robert S Loewe
(74) *Attorney, Agent, or Firm* — Avery N. Goldstein; Blue Filament Law, PLLC

(57) ABSTRACT

A tire dressing is provided with a fine polymer-based reflective particles formed form of a blend of anisotropic particles of varying color that introduce an added reflective surface not present in ordinary tire dressings. The use of the fine polymer-based reflective particles enhance gloss, shine, and light reflectivity to the applied surface. The enhanced reflective surface effect is more noticeable during vehicle motion and the tire is rotating, as light is reflected from different reflective particles due to the changing angle of the particles caused by the rotation of the tire. The effects are more subtle than the typical effect of glitter due to the small particle size and the utilization of a mixtures of several types of polymer reflective particles that range from dark to bright and vary in color, and the presence of the high refractive index liquid silicone fluid that results in a brilliant radiant shine.

6 Claims, 1 Drawing Sheet

(56) References Cited

U.S. PATENT DOCUMENTS

| | | | |
|---|---|---|---|
| 5,507,969 A | 4/1996 | Shinohara | |
| 5,525,427 A | 6/1996 | Griswold et al. | |
| 5,578,298 A | 11/1996 | Berthiaume et al. | |
| 5,623,017 A | 4/1997 | Hill | |
| 5,661,208 A | 8/1997 | Estes | |
| 5,759,983 A | 6/1998 | Mondin et al. | |
| 6,013,323 A | 1/2000 | Klayder et al. | |
| 6,071,975 A | 6/2000 | Halloran | |
| 6,080,387 A | 6/2000 | Zhou et al. | |
| 6,147,078 A | 11/2000 | Sanderson et al. | |
| 6,153,569 A | 11/2000 | Halloran | |
| 6,180,117 B1 | 1/2001 | Berthiaume et al. | |
| 6,221,811 B1 | 4/2001 | Policello et al. | |
| 6,221,833 B1 | 4/2001 | Colurciello, Jr. | |
| 6,489,393 B1 | 12/2002 | Sitabkhan et al. | |
| 6,506,715 B1 | 1/2003 | Schultz et al. | |
| 6,602,835 B2 | 8/2003 | Schmeida et al. | |
| 8,623,454 B2 * | 1/2014 | Huang | C09D 5/008 427/140 |
| 8,974,589 B2 * | 3/2015 | Serobian | C09G 1/16 106/287.1 |
| 2002/0161105 A1 * | 10/2002 | Rodgers | C09D 183/04 524/588 |
| 2004/0131787 A1 | 7/2004 | Fang | |
| 2008/0234421 A1 * | 9/2008 | Hart | C09G 1/12 524/413 |
| 2010/0024935 A1 * | 2/2010 | Jubran | B05D 5/063 152/151 |

\* cited by examiner

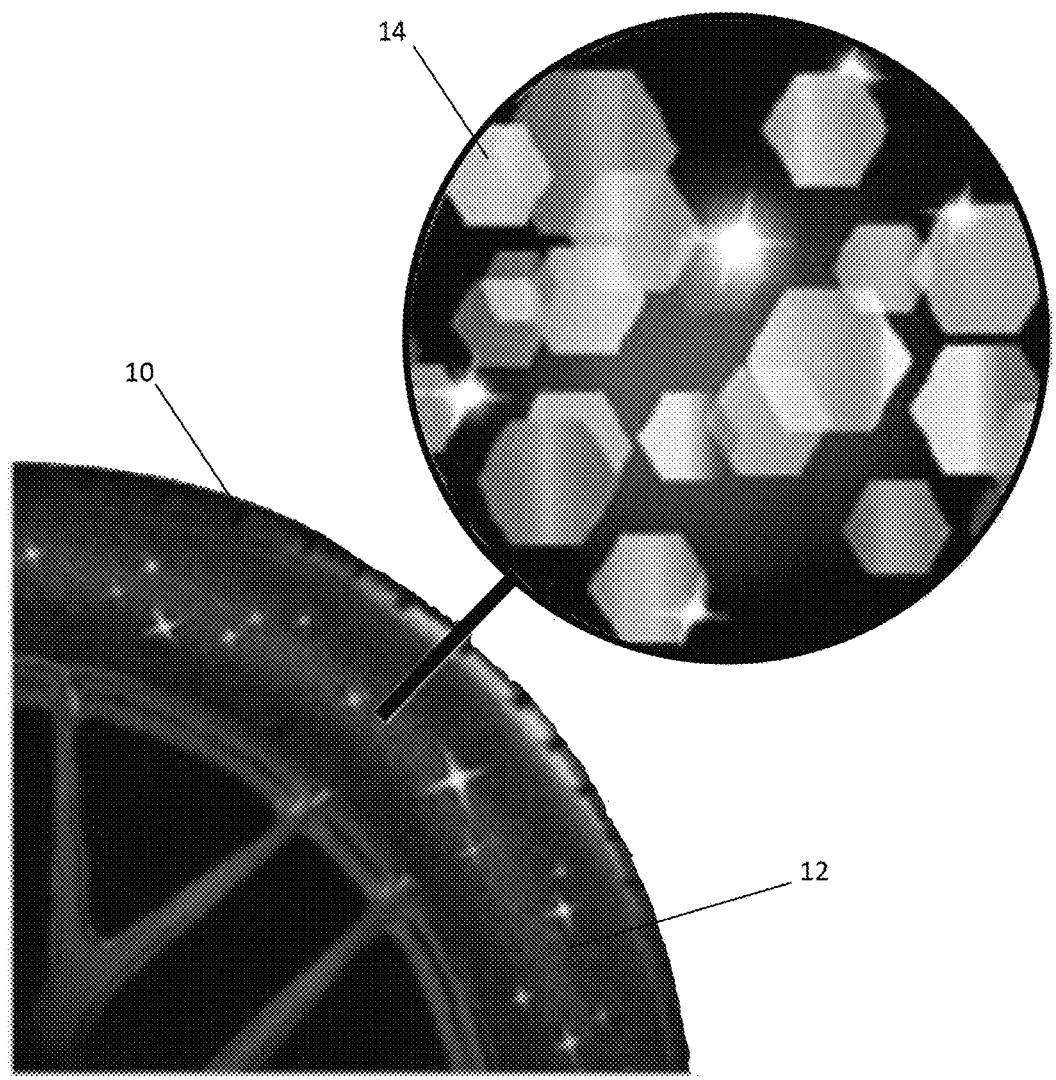

SURFACE TREATING COMPOSITION AND METHOD OF USE

FIELD OF THE INVENTION

The present inventions in general relates to an aqueous-based tire dressing composition for vehicle tires, and in particular to a liquid formula containing fine polymer-based reflective particles that provide added reflective surfaces not present in ordinary tire dressings.

BACKGROUND OF THE INVENTION

Tires and wheels are critical to the overall appearance and safe operation of a vehicle, however, tires are in continual contact with the road and suffer from adverse effects of road tar, dirt, grime, water, salt, brake dust, grease, ultra violet radiation (UVR), ozone, and oxygen. Over time, tire rubber simply degrades, and vehicle manufacturers recommend, independent of tire mileage, that tires be replaced, typically after six years in an effort to limit sudden failure.

Tire dressing is a product applied to tires to impart shine common to new tires. Tire dressings also impart a protective barrier that inhibits cracking, fading and hardening of tires. Tire dressings are typically available in trigger sprays and aerosols that can be sprayed or wiped on the tire sidewall. Other variations of tire dressing include thickened liquids delivered as gels and waxes, typically applied with a sponge or other applicator. Tire dressing are recommended not be applied to the tire tread because the dressing will make the tread slippery. There are generally two types of tire dressings available on the market based on hydrophilicity of the composition: water-based and solvent-based.

Water-based tire dressings often have a milky-white colloidal appearance. Water-based dressings are typically a combination of naturally occurring oils and synthetic polymers that provide a non-greasy, satin-like finish, which is similar to the look of a new tire. Some water-based tire dressings also contain UVR blocking agents to help keep tires from cracking, fading and hardening. As an added bonus, most, if not all, water-based dressings are biodegradable and environmentally friendly in limiting VOCs.

Solvent-based silicone tire dressings are often clear, tacky liquids that leave a wet, glossy film on the tire surface. However, some solvent-based dressings contain petroleum distillate solvents that, over time, may lead to premature drying and cracking of the tire surface. The difference between water and solvent-based dressings is simply in the carrier system used. Solvent-based products use a hydrocarbon silicone to suspend the product whereas water-based products use water.

Regardless of the nature of the tire dressing solvent system, shine is imparted to the tire through the formation of a light reflective film. While such films have high sheen as applied, adhesion of debris and disruption of the smooth continuous coating compromises both the protective barrier and visual shine. Additionally, the refractive index of the coating material limits the shine to a range of viewing angles. Whiles pigment such as iron oxide, mica, titanium dioxide, stannic oxide, metallic glitter particles such as pigmented polyethylene t-phthalate, cut metalized foils of aluminized PVC film have been used to enhance the sparkle of tire dressings, the visual effects have been less desirable in terms of sparkle.

Thus, there exists a need for tire dressings that offers reflective properties and visual effects over a wider range of viewing angles. There also exists a need for a tire dressing that is not reliant solely on a continuous film coating to impart visual shine.

SUMMARY OF THE INVENTION

A liquid aerosol tire dressing composition is provided that includes a silicone fluid is present at 10-25 weight percent of the composition. A propellant is present at 15-30 weight percent of the composition. A mixture of reflective anisotropic polymer particles contains present at 1-4 weight percent of the composition to impart reflectivity from a variety of viewing angles with a remainder of the composition being solvent.

The liquid aerosol tire dressing composition is applied by a method that includes cleaning a target tire sidewall. A dispensing can containing the composition is shaken to provide uniform suspension of the reflective polymer particles in the composition. The composition is sprayed from the container to form a coating on the target tire sidewall to form a film containing the anisotropic particles.

BRIEF DESCRIPTION OF THE DRAWINGS

The present invention is further detailed with respect to the following FIGURE that depicts various aspects of the present invention.

FIG. 1 illustrates a partial side view of a tire treated with the inventive tire dressing with a detail showing the reflective particles in accordance with embodiments of the invention.

DETAILED DESCRIPTION OF THE INVENTION

The present invention has utility as a tire dressing provided as a liquid formula containing fine polymer-based reflective particles with random orientations. The fine polymer-based reflective particles introduce an added reflective surfaces not present in ordinary tire dressings. In a specific embodiment the fine polymer-based reflective particles are a blend of micro-hexagonal metallized particles with random orientations. The use of the fine polymer-based reflective particles enhance gloss, shine, and light reflectivity to the applied tire sidewall surface. The reflective surface effect is more noticeable when the vehicle is in motion and the tire is rotating, as light is reflected from different fine polymer-based reflective particles due to the changing angle of the particles caused by the rotation of the tire and the particles random orientations. The effects are more subtle than the typical effect of glitter on a surface due to the small particle size of the fine polymer-based reflective particles and the presence of the high refractive index liquid silicone fluid (polydimethyl siloxane) that results in a brilliant radiant shine. In addition, the subtleness of the effect comes from the utilization of a proprietary mixtures of several types of polymer reflective particles that range from dark to bright and vary in color. Specific inventive embodiments combine a blend of superior silicones and hydrophobic polymers that deliver an extreme shine.

It is to be understood that in instances where a range of values are provided that the range is intended to encompass not only the end point values of the range but also intermediate values of the range as explicitly being included within the range and varying by the last significant FIGURE of the range. By way of example, a recited range of from 1 to 4 is intended to include 1-2, 1-3, 2-4, 3-4, and 1-4.

Embodiments of the inventive tire dressing remain a liquid on the tire surface while adding a higher gloss and a sparkle that from a commonly observed distance of several yards appears to be a higher gloss without the dramatic (and off-putting to many observers) effects of large glitter particles. The fine polymer-based reflective particles are sized to be suitable to deliver through an aerosol valve and actuator and may be supplied and dispensed as a liquid aerosol product. Therefore, embodiments of the inventive tire dressing are as convenient and easy to use as current aerosol tire dressings and follow the same procedures as consumers commonly use to apply tire dressing, so there is no learning curve needed. While the visual effects of embodiments of the inventive tire dressing are instant and dramatic compared to typical tire dressing, the use of the product is not so different that consumers will be uncomfortable using the product.

An inventive tire dressing composition includes at least one silicone fluid having a viscosity of between 40 and 500,000 centiStokes, as measured at room temperature. Suitable silicone fluids operative herein illustratively include polydialkylsiloxanes where the alkyl is in each instance a ci $c_4$ such as polydimethylsiloxane, and the methyl groups along the chain can be substituted by many other groups, e.g., phenyl, vinyl, or trifluoropropyl. Representative silicone fluids operative herein and conventional to the art are detailed in the U.S. Pat. Nos. 6,602,835; 6,506,715; 6,221,833; 6,221,811; 6,180,117; 6,153,569; 6,147,078; 6,080,387; 6,071,975; 6,013,323; 5,759,983; 5,661,208; 5,623,017; 5,578,298; 5,525,427; 5,507,969; 5,378,271; 5,326,483; 5,244,598; 5,183,845; 5,077,040; 5,057,572; 4,999,398; 4,880,557; 4,790,877; 4,600,436; and 3,956,174. In a certain inventive embodiments, the at least one silicone fluid includes two silicone fluids of varying molecular weight. For example, a first silicone fluid has a viscosity of between 40 and 5,000 centiStokes while a second silicone fluid is employed with a molecular weight of between 5,000 and 500,000 centiStokes. It is appreciated that the molecular weights and film forming properties of the high viscosity and low viscosity silicone materials function synergistically to provide an overall high quality coating from an inventive composition. Without intending to be bound by a particular theory, it is believed that a low molecular weight silicone fluid tends to stay liquid and readily sprayable and affords durability and a high gloss coating to the tire surface. The high molecular weight silicone fluid tends to have a degree of tack that promotes adhesion to the tire surface itself or a base silicone material preexisting on the tire surface. By way of example, a 1,000 centiStokes polydimethylsiloxane polymer and a 100,000 centiStokes polydimethylsiloxane polymer in combination interact to form a coating on a tire surface that has high gloss, durability and good sprayability properties, as applied through a pressurized aerosol container. In instances when the at least one silicone fluid includes two silicone fluids that vary in viscosity, the ratio of lowest viscosity silicone fluid:highest viscosity silicone fluid range from 0.2-5:1 by weight with the exact ratio of silicone fluids being determined by factors that include in part viscosity of the specific silicone fluids, viscosity differential between the various silicone fluids present, total weight percent of silicone fluids in the composition, and the chemical structure of various silicone fluids. Silicone fluid is present at 10-25 weight percent of an inventive composition.

A solvent is provided to dissolve the silicone fluid. Solvents operative herein include nonpolar solvents and polar solvents. Nonpolar solvents operative herein illustratively include toluene, cumene petroleum distillate, mineral oil, and a combination thereof. Polar solvents operative herein illustratively include esters, ethers, glycol ethers, amides, alcohols, and volatile silicones. Exemplary esters include triglyceride, ethyl acetate, soy methyl ester, and dipropylene glycol methyl acetate. An exemplary ether includes dioctyl ether. Exemplary glycol ethers include butyl cellusolve, tripropylene glycol, and dipropylene glycol methyl ether. An exemplary amide includes dimethylformamid. Exemplary alcohols include alkane polyols, aromatic polyols, and alicyclic alcohols. Exemplary alkane polyols include tetradecanol; 2-ethyl-2-methyl-1,3 propanediol; 2-ethyl-1,4-butanediol; 1,3-hexanediol; and 1,6-hexanediol. Exemplary aromatic alcohols include 3-phenyloxy-1,2-propanediol and 3-benzyloxy-1,2-propanediol. An exemplary alicyclic diol includes 5-cycloocetane-1,2-diol. An exemplary volatile silicone includes cyclic silicones that are liquids are room temperature of 20 degrees Celsius.

The organic solvent can be provided as a low VOC (volatile organic compound) solvent. In general, a low VOC solvent refers to a solvent exhibiting a vapor pressure of less than 0.1 mm Hg at 20 degrees Celsius. Regardless of the nature of the solvent or solvent mixture, solvent is present at 40-60 weight percent of the composition.

An inventive tire dressing composition includes a halocarbon or hydrocarbon propellant in instances when an aerosol delivery system of an inventive tire dressing composition is desired. Aerosol propellants operative herein illustratively include difluoroethane, trifluoroethane; alkanes such as butane, pentane, isobutane; propane; ethers such as dimethyl ether and diethyl ether; nitrogen; carbon dioxide; and combinations thereof. The resultant composition inclusive of a propellant is sealed within a conventional metal aerosol canister and applied by spray application as is conventional to the art. The propellant is present at 15-30 weight percent of the composition. In some inventive embodiments, the tire dressing composition is applied with a pump spray, a sponge applicator, a non-woven sheet applicator, a woven sheet applicator.

The anisotropic reflective particles present in an inventive formulation are in the form of flakes with a small thickness relative to the remaining two dimensions so as to rest on a target tire surface with a planar face of the flake parallel to the tire surface. The anisotropic reflective particles typically have a thickness of between 0.01 and 0.1 millimeters (mm) and linear dimensions along the planar surface of the flake that are each independently between 0.01 and 0.5 mm. The anisotropic reflective particles can have a planar face space that illustratively includes circular, triangular, rectilinear, pentagonal, hexagonal, higher polygonal shapes, irregular and combinations thereof. The anisotropic reflective particles are formed from materials that illustratively include metals such as aluminum, copper, and alloys thereof; polymers such as polyethylene terephthalate (PET), vinyl, polyester, polyethylene, polyethylene naphthalate, polymethyl methacrylate, laminates including any of the aforementioned; and dyed forms of any of the aforementioned. It is appreciated that the particle flakes are selected to be stable in contact with the solvent and silicone fluid, and are sized to be exhausted from the nozzle of a propellant container. It is appreciated that the reflective particles are readily formed to exhibit a Fresnel effect. The anisotropic reflective particles are selected to vary in color, size, shape or a combination thereof. It is observed in certain inventive embodiments that a variety of reflective particles as to color when resting in a generally planar arrangement on a black tire surface produce greater sparkle as compared to monochromatic particles over the varied light conditions to which a tire is exposed to over the course of a day. Colors ranges across the visible spectrum from red through orange, yellow, green, blue to violet. The inclusion of red and blue, or red and violet particles in a composition are particularly well-suited for providing sparkle over a variety of light conditions. Anisotropic reflective particles operative herein illustratively includes sheet material that is shredded so as to have opposing planar surfaces. Shapes operative herein illustratively include circular, oval, triangular, square, rectilinear, pentagonal, hexagonal, and other polygonal shapes having from 4 to 10 sides. It is appreciated that aforementioned polygonal shaped can be either geometrically regular or irregular. It is appreciated that hexagonal flakes are well suited for space filling to efficiently cover a surface. The anisotropic reflective particles are present at 1-4 weight percent of the composition.

An inventive tire dressing composition in some inventive embodiments includes a defoaming agent in an amount present to inhibit blister formation in a tire surface dress coating so produced by the inventive composition. Silicone defoamer agents operative herein illustratively include silicone based defoamers, mineral oil based defoamers, and mixtures of foam destroying polymers and hydrophobic solids such as polyureas, as are known to the art. Specific exemplary silicone based defoamers illustratively include silica-filled polydimethylsiloxane and polyether-modified polysiloxanes.

An inventive tire dressing composition in some inventive embodiments includes a surfactant present in an amount to reduce surface tension of the inventive tire dressing composition to an extent such that the composition is able to wet the tire surface. Surfactants operative herein illustratively include nonionic polymeric fluorinated surfactants, anionic phosphonated fluorinated surfactants, nonionic ethoxylated fluorinated surfactants, polyether modified polydimethylsiloxane, polyether modified polymethylalkylsiloxane, aralkyl modified polymethylalkylsiloxane, polyester modified hydroxyl functional polydimethylsiloxane, acryl functional polyester modified polydimethylsiloxane, polyether polyester modified hydroxyl functional polydimethylsiloxane, solution of polyacrylate, solution of a fluoro modified polyacrylate.

An inventive tire dressing composition also optionally includes organic dyes; fragrances, corrosion inhibitors illustratively including triethanolamine dinonylnaphthalene, boric acid-triethanolamine salt, phosphoric acid-triethanolamine salt, ammonia, triethanolamine, capryloamphopropionate, and mixtures thereof; plasticizers; antimicrobials; and combinations thereof.

A typical composition with a range of weight percentages for embodiments of the inventive tire dressing as a liquid aerosol product is provided in Table 1.

TABLE 1

Components for an inventive tire dressing, where amounts are provided in total weight percentages.

| Description | % Weight |
|---|---|
| Silicone Polymer Mixture | 10-25 |
| Propellant | 15-30 |
| Mixture of Reflective Polymer Particles | 1-4 |
| Defoamer | 0-1 |
| Surfactant | 0-5 |
| Dye | 0-1 |
| Fragrance | 0-3 |

TABLE 1-continued

Components for an inventive tire dressing, where amounts are provided in total weight percentages.

| Description | % Weight |
|---|---|
| Corrosion inhibitor | 0-2 |
| Plasticizer | 0-2 |
| Antimicrobial | 0-2 |
| Solvent | remainder |

FIG. 1 illustrates a partial side view of a tire 10 with a sidewall 12 treated with the inventive tire dressing with a detail showing the reflective particles 14 in accordance with embodiments of the invention. The reflective particles 14 are shown as hexagonal flakes that range from dark to bright and vary in color. As previously noted, the use of the fine polymer-based reflective particles 14 enhance gloss, shine, and light reflectivity to the applied tire sidewall surface. The reflective surface effect is more noticeable when the vehicle is in motion and the tire is rotating, as light is reflected from different fine polymer-based reflective particles 14 due to the changing angle of the particles 14 caused by the rotation of the tire 10.

The present invention is further described with respect to the following non-limiting example. These examples are intended to illustrate specific compositions according to the present invention and should not be construed as a limitation as to the scope of the present invention.

Example

Application and use of the inventive tire dressing:
1. Apply tire dressing on a dry/cleaned tire sidewall in a well ventilated area
2. Shake can well to distribute particle in the solution
3. Hold can 4-6 inches from application surface (tire sidewall)
4. Spray a uniform coat on tire sidewall
5. No wiping necessary—however wipe off excess if necessary It is noted that coating uniformity will improve after driving vehicle. Tire dressing should not be applied or contact the tire tread area. Greater reflectivity is observed for this tire shine containing 3 total weight percent of hexagonal particles relative to the same formulation lacking the particles.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:
1. A liquid aerosol tire dressing composition comprising:
a silicon polymer mixture at 10-25 weight percent of the composition;
a solvent based propellant at 15-30 weight percent of the composition; and
a plurality of reflective anisotropic polymer particles at 1-4 weight percent of the composition, and having linear dimensions along the planar surface of the flake that are each independently between 0.01 and 0.5 mm, said plurality reflective anisotropic polymer particles comprise at least three colors; and
solvent.

2. The composition of claim 1 wherein said plurality of reflective anisotropic polymer particles are hexagonal.

3. The composition of claim 1 wherein the silicon polymer mixture further comprises a high refractive index liquid silicone fluid (polydimethyl siloxane).

4. The composition of claim 1 wherein said plurality of reflective polymer particles have a thickness of between 0.01 to 0.1 mm.

5. The composition of claim 1 wherein the composition is free of volatile organic compounds (VOC).

6. A method of using the liquid aerosol tire dressing composition of claim 1, the method comprising:
   cleaning a target tire sidewall to be applied to;
   shaking a dispensing can to distribute plurality of reflective anisotropic polymer particles in the composition; and
   spraying a coating on the target tire sidewall.

* * * * *